United States Patent
Axelrod

[11] 3,871,334
[45] Mar. 18, 1975

[54] PET TOY

[76] Inventor: Herbert R. Axelrod, 211 W. Sylvania Ave., Neptune, N.J. 07753

[22] Filed: Dec. 3, 1973

[21] Appl. No.: 421,260

[52] U.S. Cl. ............................... 119/29.5, 426/805
[51] Int. Cl. ............................................. A01k 29/00
[58] Field of Search .................... 119/29.5; 426/805; 117/138.8 N, 113; 128/359, 360, 15

[56] References Cited
UNITED STATES PATENTS
2,610,851  9/1952  Jones ............................... 119/29.5
3,104,648  9/1963  Fisher ........................... 119/29.5 X Primary Examiner—Hugh R. Chamblee
Attorney, Agent, or Firm—Fulwider, Patton, Rieber, Lee & Utecht

[57] ABSTRACT

There is disclosed a chewing toy item for animals, typically for household pets such as dogs, which has permanent flavor and odor components. The flavor and odor components are thoroughly impregnated into the Nylon substrate of the toy item. These flavor and odor components are prepared by cooking of meat and animal by-products in a pressured, steam atmosphere out of contact with a liquid phase and the volatilized flavor and odor components are condensed and absorbed in a contiguous liquid phase within the cooking vessel. This produces an impregnating solution which is free of solids and suspended liquids, such as meat particles and fat globules, which will thoroughly impregnate the Nylon substrate of the toy item without the formation of a protective or isolating film on the outer surfaces thereof. The impregnation is achieved by immersing the preformed toy item within the aqueous solution in the cooking vessel and subjecting the toy item to prolonged contact with the solution, e.g., for periods from about 7–20 hours at cooking conditions, e.g., a pressure from 15 to about 60 psia and a temperature from 210° to about 290° F. The resultant product is a useful chewing toy item for animals which is thoroughly and permanently impregnated with meat flavor and odor components and which, therefore, retains a high attractiveness to animals throughout its useful life.

9 Claims, 4 Drawing Figures

PATENTED MAR 18 1975 3,871,334

PET TOY

BACKGROUND OF THE INVENTION

The invention relates to a chewing toy item and, in particular, an artificial bone for animal pets. Chewing toys for animals should, desirably, be durable and retain attractiveness to the animal throughout their useful life. Highly resilient materials formed of rubber and resilient plastics such as Nylon have been employed in the past as chewable toys because of the strength of the plastic materials to resist the shearing and tearing forces applied by the animal. These materials, however, are relatively impermeable and nonabsorbent so that flavor and odor components which could be useful to provide an enticement and attractiveness to the toy cannot be readily applied to the toy. Consequently, flavor and odor components have, in the past, been only applied to the surface of the toy as a coating and this coating is quickly lost during the chewing of the toy.

A number of pliable and absorbent materials such as woven fibers, rope, etc., have been suggested as useful substrates for chewing toys. While these materials are absorbent so that flavor and odor components can be impregnated substantially throughout the substrate of the toy, the pliable materials lack sufficient strength to preserve their integrity. The chewing action rapidly destroys the structure of the toy and a durable and lasting product is not achieved. In addition, the lack of strength of the substrate permits the chewing action to expose new surface area so that any flavor and odor components are extracted in a relatively short time from the substrate.

Another material which has been employed in the past is rawhide and toys have been formed of, or coated with rawhide. The rawhide contains natural flavors that are attractive to the animal. These products, too, are readily destroyed or consumed by the animal.

It is an object of this invention to provide a durable chewing toy item for animals.

It is a further object of the invention to provide such a toy item which will retain an attractive flavor and/or scent throughout its life.

It is a further object to provide a simple, integral, one-piece toy item construction which contains meat flavors and scents absorbed and impregnated therein.

it is a further object of this invention to provide a method for the preparation of a meat flavor and scent impregnating solution.

It is a further object of the invention to provide a method for impregnating highly resilient, plastic, chewing toy items with meat flavors and scents.

BRIEF STATEMENT OF THE INVENTION

This invention comprises a durable chew toy item for animals which is formed of a resilient, plastic material and which is thoroughly and completely impregnated with meat flavors and odor bodies. The toy item is formed of a Nylon polymer which has a moisture absorbency at ambient conditions of from 0.5 to about 5 weight percent, preferably from 0.75 to about 2.5 weight percent. Nylons are polyamides which are formed by the condensation of polyfunctional carboxylic acids and polyfunctional amines, e. g., the condensation of adipic acid and hexamethylene diamine. The close similarity of molecular structure of the repeating units of the polymides to natural proteins, which are the odor and flavor components, provides a very high affinity between the polyamide and such odor and flavor components. This greatly reduces the volatility of the latter to such a degree that they are not readily detectable by humans although still remaining attractive and pleasing to animals when absorbed in the polyamide substrate. These polymers are readily available as molding powders and can be readily molded into the desired shapes and sizes suitable for chewing toys, e.g., bones, balls, dumbells, etc.

The aforementioned toy items are impregnated with flavor and odor components which are obtained from meat and animal by-products. The flavor and odor components are condensed and absorbed into a liquid impregnating solution which is maintained out of direct contact with the meat and animal by-products during a pressure cooking operation. This is achieved by suspending the meat and animal by-products in the vapor phase of a pressure vessel which contains a pool of water. The vessel is closed and heated to a temperature from 210° to about 290° F., developing an autogenous pressure from 15 to about 60 psia and the meat and animal by-products are cooked in the resultant steam atmosphere generated within the pressure vessel. Preferably, pressures from about 20 to about 40 psia are employed with cooking temperatures from 228° to about 260° F. The volatile flavor and odor components, which are expelled from the meat and animal by-products during this operation, are condensed into the aqueous liquid within the pressure vessel. The aqueous liquid in the pressure vessel, therefore, comprises a liquid solution of flavor and odor components which is entirely free of any suspended solids or liquids such as meat particles and fat globules.

This liquid solution can be used by immersing the toy items to be impregnated beneath the liquid level of the solution and subjecting it to cooking temperatures and pressures. Preferably, the impregnation is performed simultaneously with the aforementioned cooking operation. In this manner, a simultaneous cooking and impregnating can be practiced by charging the toy items for impregnation into the liquid within the vessel and placing a fresh supply of meat and animal by-products in a basket that is suspended in the vapor phase within the vessel. Typically, the toy items are impregnated at a temperature of from 210° to about 290° F. at autogenous steam pressure and for a period of time from 3 to about 20 hours, preferably from 7 to about 12 hours, to achieve thorough impregnation. In the preferred embodiment, the meat and animal by-products are, of course, subjected to similar conditions of time, temperature and pressure.

DESCRIPTION OF THE PREFERRED EMBODIMENT

Figure 1:
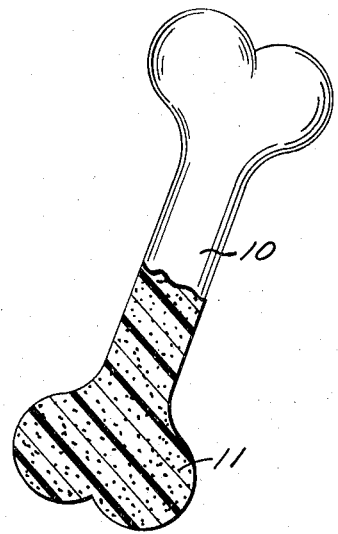
FIG. 1 illustrates a chew toy item formed in accordance with this invention.

FIG. 1 illustrates a typical chew toy item in accordance with this invention. This item is formed of a polyamide substrate, typically Nylon, having a water absorbency from about 1 to about 2 weight percent. These polyamides are commercially available as Nylons from the DuPont Chemical Company. The polyamides, such as Nylon, also provide a substrate which exhibits surface roughening upon being chewed. The chewing action actually produces short tuffs or frizzles of material projecting from the surface of the bone. As the animal chews into the bone, its teeth sink into the frizzle and the teeth are cleaned by a scouring action of the frizzle. The thickness and location of the frizzle on the surface of the bone varies with the particular animal and its chewing habits. It will, however, be formed on the locations of the bone which are chewed the most by the animal and, hence, will develop a surface which is characteristic for each animal. As illustrated in FIG. 1, 10 represents the substrate which is formed by molding or other plastics shaping operations into a desirable size and shape, e.g., into an artificial bone. The substrate is uniformly and thoroughly impregnated with flavor and odor components which are represented as 11, it being understood that these materials are dispersed throughout the body 10 in molecular or near molecular dispersion. The toy item is completely free of any coating or outer skin formed of meat products such as solids and fat globules, and this thorough impregnation without the formation of an outer sealing or protective covering is achieved by the method of impregnation used in this invention.

The method for impregnating of the polyamide substrate in a uniform and thorough manner without the formation of an outer skin or coating is achieved by the use of an aqueous solution of meat and animal by-product flavor and odor bodies which is free of suspended solids and emulsified liquids such as meat and bone particles or fat globules. This is achieved by the method of the invention which comprises the cooking of meat or animal by-products in a vapor zone surrounded by steam which is in direct contact with the aqueous solution.

Figure 2:
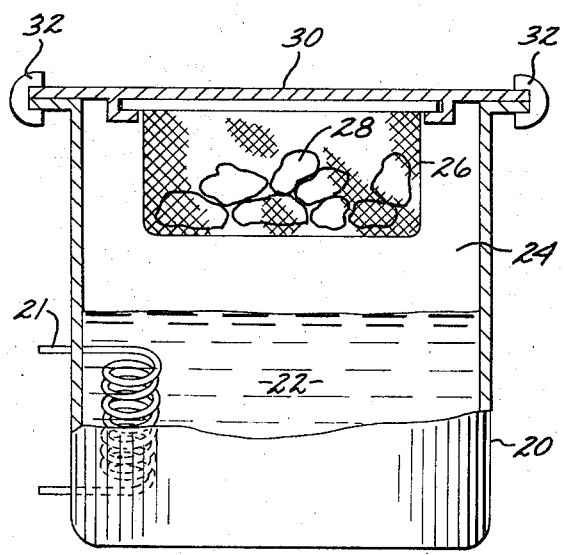
FIG. 2 illustrates the first step in preparation of the impregnating solution.

The cooking operation is illustrated in FIG. 2 wherein a pressure vessel 20 is shown containing an aqueous liquid 22 which partially fills the cavity of the pressure vessel and thereby provides liquid and vapor phases. The vapor phase 24 is shown to surround a foraminous receptacle, e.g., wire basket 26, in which are suspended meat or animal by-products 28. The preferred materials are smoked ham and chicken meat and by-products. Ham hocks, scraps, shank ends, turkey or chicken necks, backs, ox tails, etc. can be used and constitute preferred materials.

Vessel 20 is illustrated as a conventional, low pressure vessel having a removable lid 30 secured thereto by suitable and conventional clamp means 32. The vessel 20 suitably can be designed for operation at pressures from about 5 to about 100 psia, preferably from 15 to about 60 psia. These pressures correspond to autogenous pressures of steam at temperatures of 160 to about 328, preferably from 210° to about 290° F. Basket 26 is shown as suspended from lid 30 of the vessel; other suitable means, such as upright, internal stands, etc., can, of course, be used to insure that the meat and animal by-products within basket 26 are retained out of contact with liquid 22 of vessel 20. A coil of tubing 21 can be provided in the liquid zone of vessel 20 and a suitable heat exchange fluid can be passed therethrough to effect heating or cooling of the liquid 22. Other conventional heating or cooling means can also be used.

FIG. 2 illustrates the vessel as employed for the preparation of a fresh impregnating solution. Typically, the vessel is charged with water and meat and animal by-products in weight proportions from 2:1 to about 1:2 parts meat and animal by-products per part of water. In preparation of a fresh impregnating solution, the materials in vessel 20 can be subjected to the cooking conditions for a period of from 0.5 to about 10, preferably from about 2 to 6 hours. Optionally, the meat and animal by-products can be removed from the basket and replaced with fresh products and the cooking can be repeated. Upon completion of the aforementioned period, there will be obtained an aqueous liquid containing dissolved meat odor and flavor components, free of any suspended solid and liquid materials. This solution can be used for impregnation of the polyamide toy items without formation of any protective film on the polyamide substrates.

Figure 3:
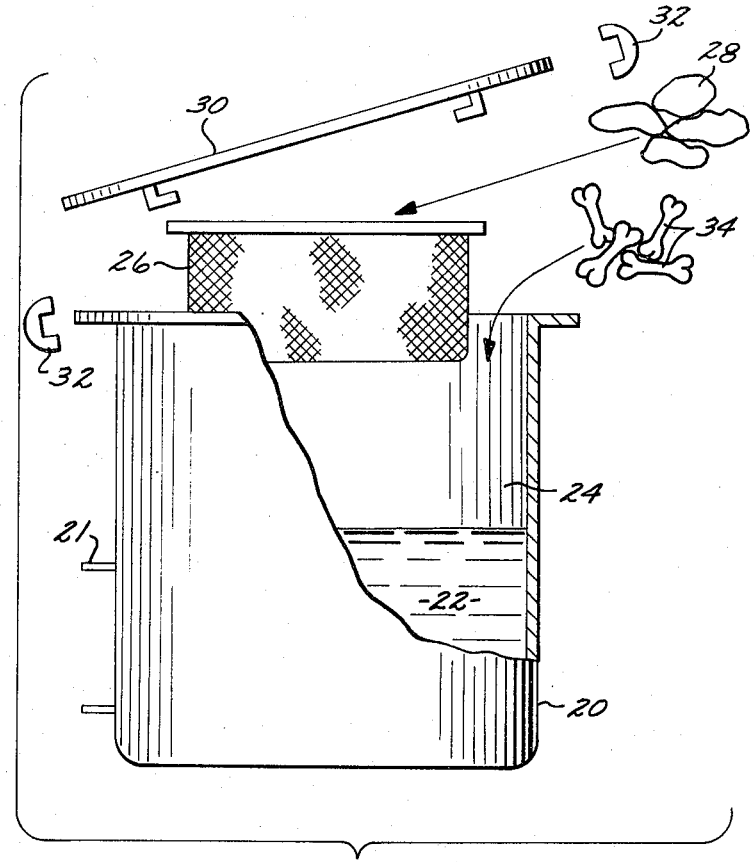
FIG. 3 illustrates the loading of a pressure vessel for impregnating of the chew toy items.

FIG. 3 illustrates the charging of the vessel 20 with the items for impregnation. As shown in FIG. 3, lid 30 is removed, the animal and meat by-products 28 in basket 26 are replaced with fresh materials and the toy items, molded of a polyamide such as Nylon, are charged to liquid 22. It is preferred to cool the contents of vessel 20 to near ambient conditions before opening the vessel so that the loss of volatile odor and flavor components is minimized. Accordingly, liquid 22 is preferably cooled to a temperature below about 120° F., and most preferably to a temperature below 100° F. before opening vessel 20. This can be accomplished by circulation of a cooling fluid through tubing 21.

Figure 4:
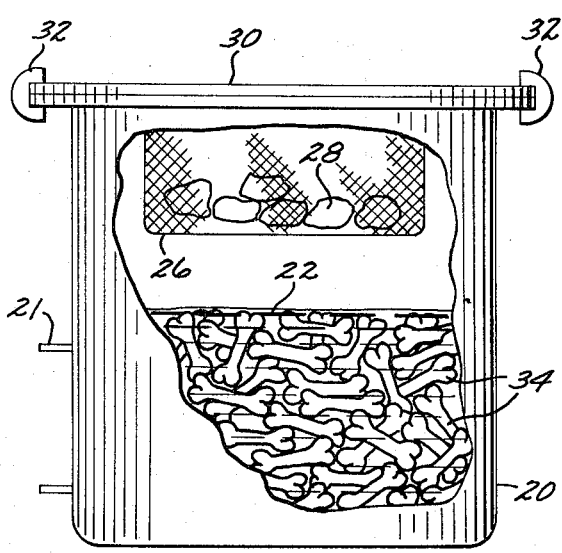
FIG. 4 illustrates the step of impregnating of the chew toy items.

The molded toy items 34 are charged to the solution in an amount from about 5:1 to 1:5 weight parts toy items per weight part of solution, preferably from 2:3 to about 3:2 parts by weight per part of solution. The liquid 22 within the vessel 20 should be sufficient to completely immerse the products charged to the vessel 20 and, if necessary, some fresh water can be added to insure that the items 34 are completely immersed. The basket 26 is also charged with fresh meat and animal by-products by removing those present in the basket and placing therein fresh meat and animal by-products. With each charge of molded toy items, approximately 0.1 to about 2 pounds, preferably from about 0.2 to about 1 pound of meat and animal by-products per pound of toy items are charged. The lid 30 is then replaced on the vessel and secured thereto by clamps 32 and the vessel is heated to the cooking conditions, sufficient to generate an autogenous steam pressure of from 15 to about 60 preferably from about 20 to about 40 psia. This corresponds to the aforementioned temperatures of from 210° to about 290° F., preferably from 228° to about 260° F. This step in the impregnating process is illustrated in FIG. 4 where the molded toy items 34 are shown immersed within liquid 22 and the freshly charged meat and animal by-products 28 are contained within the foraminous basket 26 within the closed pressure vessel 20. The impregnation is continued for a period of time from 3 to about 20 hours, preferably for about 7 to about 12 hours and thereafter the vessel is cooled, depressured and opened, and the impregnated items are removed and rinsed in cold, fresh water to remove any occluded impregnating solution from the surface of the items. The duration of the impregnating period will control the length of usefulness of the toy item. The longer the impregnation period, the longer lasting will be the scent of the item. Typically, impregnation for 1 hour provides an item with a useful life of 6 months; for 4 hours provides a life of 1 year; for 16 hours provides a life of 2 years. Thereafter the vessel can again be used for impregnating of the toy items by repeating the steps illustrated by FIGS. 3 and 4.

EXAMPLE

An impregnating solution was prepared by charging vessel 20 with 2 gallons water and basket 26 with eight pounds of ham and eight pounds of chicken backs and necks. The vessel was closed and heated to approximately 250° F. and maintained at that temperature for 5 hours under an autogenous steam pressure of 30 psia. After 5 hours, the vessel was cooled, depressured, opened and the meat products were removed from basket 26. Water was added to the liquid solution 22 within the vessel to bring its volume to the original 2 gallons and the basket 26 was refilled with 16 pounds of ham and chicken by-products. The vessel was then closed and again heated to 250° F. and maintained at that temperature for an additional 5 hours.

Thereafter, the vessel was cooled, depressured, opened and 120 regular size dog bones molded of Nylon 101, approximate total weight of 25 pounds, were placed within the liquid of vessel 20 and sufficient water was added thereto to completely immerse the toy bones. The meat basket 26 was emptied and fresh meat products in the amount of 3 pounds ham and 3 pounds chicken by-products were placed in the basket. The lid was placed on the vessel, secured thereto, and the vessel contents were heated to 259° F. and maintained at that temperature for a period of about 10 hours. The autogenous pressure within the vessel was approximately 35 psia.

After completion of the 10 hour period, the vessel was cooled, depressured and opened and the toy items were removed from the liquid solution 20 and rinsed in cold, clear water, dried and packaged for sale. The meat products within basket 26 were removed and the vessel was employed for additional impregnation of toy bones by charging the bones thereto together with fresh animal and meat by-products in the aforedescribed manner. This procedure was repeated to impregnate a large quantity of molded toy bones of polyamides.

The invention has been described with reference to a presently preferred mode of practice. It is not intended that this illustration be unduly limiting of the invention which is to be defined by the steps, and their obvious equivalents, set forth in the following claims.

I claim:
1. A method for the manufacture of a chewing toy and the like for animal pets which comprises:
   a. forming a toy item in the shape of a bone and the like from a Nylon molding resin having a water absorbency from 0.5 to about 5 weight percent.
   b. dissolving meat odors and flavors in an aqueous impregnating solution while maintaining said solution free of suspended solid and fat materials by subjecting meat or animal by-products to steam at a temperature from 210° to about 280° F. and autogenous pressure for a period from 3 to about 20 hours while in the presence of, but out of contact with, water; and
   c. immersing said toy item in said aqueous impregnating solution and maintaining it therein for a period of time from 3 to about 20 hours at a temperature from 210° to about 280° F. autogenous pressure.
2. The method of claim 1 including the steps of removing said toy item from said impregnating solution and washing and drying said toy item.
3. The method of claim 2 wherein steps (b) and (c) are performed simultaneously.
4. The method of claim 2 wherein from 2:1 to about 1:2 weight parts meat or animal by-products per weight part of water is used in preparation of said aqueous impregnating solution.
5. The method of claim 1 wherein a plurality of said toy items are immersed in said impregnating solution in an amount from 5:1 to 1:5 weight parts items per part of solution.
6. The method of claim 2 wherein said toy item is immersed in said aqueous impregnating solution at a temperature from 228°F to about 260°F.
7. The method of claim 1 wherein steps (b) and (c) are performed simultaneously.
8. The method of claim 7 wherein said solution is used for impregnation of a plurality of batches of said toy items by placing successive batches of said toy items in said aqueous solution and successive, fresh batches of said meat or animal by-products in the presence of said aqueous impregnating solution.
9. The method of claim 1 wherein said aqueous impregnating solution is prepared by subjecting meat or animal by-products to contact with steam at a temperature from 210°F to about 280°F and autogenous pressure for a period of from about 0.5 to about 10 hours before using said solution for impregnation of said toy item.

* * * * *